United States Patent [19]
Domenge

[11] Patent Number: 5,209,507
[45] Date of Patent: May 11, 1993

[54] TRANSMISSION SYSTEM FOR TANDEM BICYCLES

[76] Inventor: Alberto Domenge, Fuente de las Aguilas 194, Tecamachalco 53950, Edo de Mex., Mexico

[21] Appl. No.: 837,108
[22] Filed: Feb. 18, 1992

Related U.S. Application Data

[63] Continuation of Ser. No. 593,959, Oct. 9, 1990, abandoned.

[51] Int. Cl.$^5$ .............................................. B62M 1/02
[52] U.S. Cl. .................................... 280/231; 280/239; 280/261
[58] Field of Search ............... 280/210, 214, 230, 231, 280/239, 259, 261, 279, 288.1, 260

[56] References Cited

U.S. PATENT DOCUMENTS

| | | | |
|---|---|---|---|
| 357,110 | 2/1887 | Weston et al. | 280/231 |
| 448,358 | 3/1891 | Moore | 280/231 |
| 605,365 | 6/1898 | Weaver | 280/231 |
| 628,843 | 7/1899 | Pedersen | 280/231 |
| 1,360,032 | 11/1920 | Schiffner et al. | 280/261 |
| 1,687,218 | 10/1928 | Kutarna | 280/273 |
| 4,661,172 | 5/1987 | Hartmann | 280/260 |
| 4,773,662 | 9/1988 | Phillips | 280/230 |

FOREIGN PATENT DOCUMENTS

| | | | |
|---|---|---|---|
| 0054895 | 5/1890 | Fed. Rep. of Germany | 280/230 |
| 3641311 | 2/1988 | Fed. Rep. of Germany . | |
| 0914900 | 10/1946 | France | 280/273 |
| 0478875 | 1/1938 | United Kingdom | 280/231 |
| 2095631 | 10/1982 | United Kingdom . | |

*Primary Examiner*—Margaret A. Focarino
*Assistant Examiner*—A. M. Boehler
*Attorney, Agent, or Firm*—Sandler Greenblum & Bernstein

[57] ABSTRACT

A transmission system is provided for a tandem bicycle having a frame on which are mounted a front, steerable, ground engaging wheel, and a rear, driven, ground engaging wheel. The bicycle also includes front and rear pedal systems, each of which includes a shaft rotatably mounted in a hub carried by the frame, each shaft having axial ends to which pedal cranks are connected for rotating the shaft in response to pedal rotation of the cranks. The transmission system includes first apparatus for coupling the shaft of the front pedal system to the rear wheel so that pedal rotation of the cranks connected to the last mentioned shaft imparts rotation to the driven wheel. The system further includes second apparatus for coupling the shaft of the rear pedal system to the rear wheel so that pedal rotation of the cranks connected to the last mentioned shaft imparts rotation to the driven wheel. The first and second apparatus are constructed and arranged so that pedal rotation of the cranks connected to one of the shaft imparts rotation to the driven wheel without imparting rotation to the other of the shafts.

18 Claims, 9 Drawing Sheets

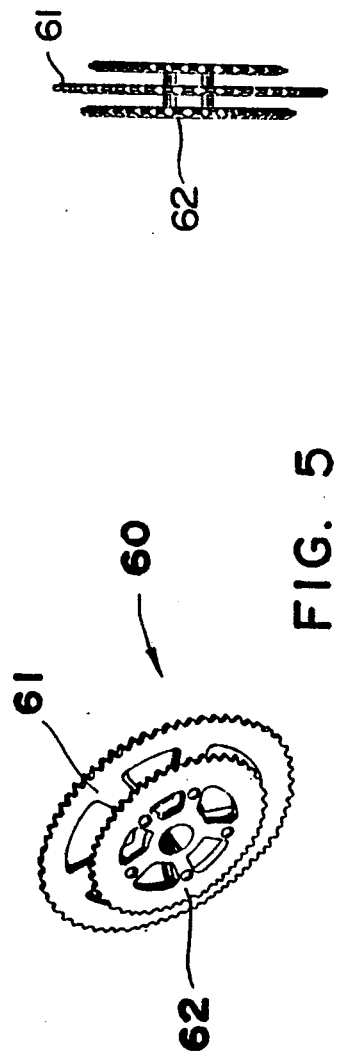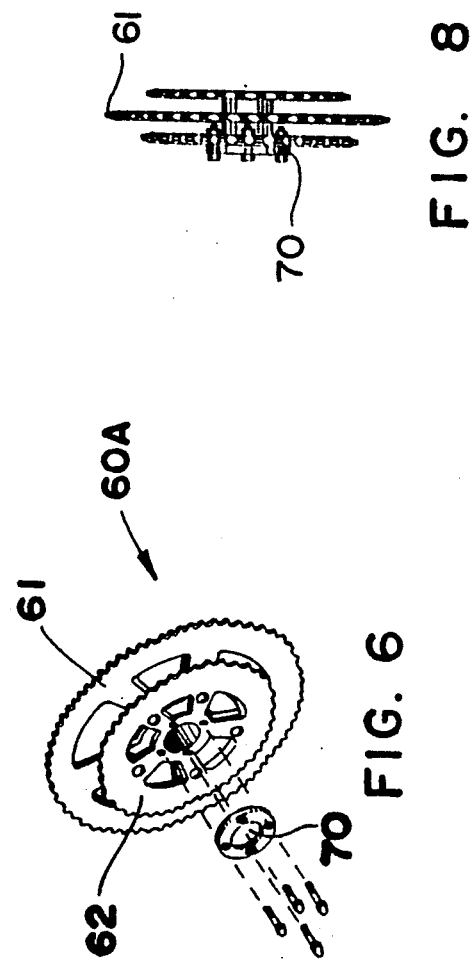

TRANSMISSION SYSTEM FOR TANDEM BICYCLES

This application is a continuation of application Ser. No. 07/593,959, filed Oct. 9, 1990, now abandoned.

TECHNICAL FIELD

This invention relates to a transmission system for tandem bicycles.

BACKGROUND ART

Tandem bicycles have a frame on which are mounted a front ground engaging wheel that is steerable by the captain of the bicycle who is positioned at the front thereof, and a rear ground engaging wheel that is driven by the captain using a front pedal system and by a stoker, positioned rearwardly of the captain, using a rear pedal system. Each of the pedal systems includes a shaft rotatably mounted in a hub carried by the frame. Connected to the axial ends of each shaft are pedal cranks that terminate in pedals by which a user inputs pedaling motion to rotate the shaft.

Conventionally, the shafts of the front and rear pedal systems are connected to the driven wheel of the bicycle by a transmission system that operates to couple the front pedal system to the rear pedal system. As a consequence, pedal input by the riders is not independent. That is to say, one rider is unable to terminate pedaling if the other chooses to continue. Moreover, the transmission system usually includes a gear changing mechanism, to establish the mechanical advantage between the pedal system and the driven wheel. Such mechanism is usually under the exclusive control of the captain. As a result, the mechanical advantage achieved with the gear changing mechanism is the same for each rider and is thus independent of their physical abilities which may be significantly different. Consequently, riders with different physical abilities, or endurance, or stamina cannot be accommodated with a conventional transmission system.

It is therefore an object of the present invention to provide a new and improved transmission system for tandem bicycles which overcomes or substantial ameliorates the deficiencies of the prior art as described above.

BRIEF DESCRIPTION OF THE INVENTION

According to the present invention, a transmission system for tandem bicycles is provided for a bicycle having a frame on which are mounted a front steerable ground engaging wheel, and a rear driven ground engaging wheel. The bicycle includes front and rear pedal systems, each of which includes a shaft rotatably mounted in a hub carried by the frame, each shaft having axial ends to which pedal cranks are connected for rotating the shaft in response to pedal rotation of the cranks. According to the present invention, first means are provided for coupling the shaft of the front pedal system to the rear wheel so that pedal rotation of cranks connected to the last mentioned shafts imparts rotation to the driven wheel. The invention further provides second means for coupling the shaft of the rear pedal system to the rear wheel so that pedal rotation of the cranks connected to the last mentioned shaft imparts rotation to the driven wheel.

According to the present invention, the first and second means are constructed and arranged so that pedal rotation of the cranks connected to one of the shafts imparts rotation to the driven wheel without imparting rotation to the other shafts. As a consequence, the first and second means of the present invention provide for independent and separate connection of the pedal systems to the driven wheel such that the pedaling effort by each rider is separate and independent. This allows either one of the riders to coast without pedaling at any time and allows each rider to exert whatever level of input is comfortable without affecting the other rider.

In the preferred embodiment, the first means includes a first sprocket wheel rigidly connected to the shaft of the front pedal system, a first free-wheel cluster mechanism operatively associated with one side of the driven wheel, and sprocket chain means operatively connecting the first sprocket wheel to the first free-wheel cluster mechanism. Preferably, the sprocket chain means includes a pair of sprocket wheels rotatably mounted on the shaft of the rear pedal system, a sprocket chain operatively connecting the first sprocket wheel to one of the pair of sprocket wheels, and a sprocket chain operatively connecting the other of the sprocket wheels to the first-free wheel cluster mechanism.

Preferably, the second means includes a second sprocket wheel rigidly connected to the shaft of the rear pedal system, and a second free-wheel cluster mechanism operatively associated with the other side of the driven wheel. Second sprocket chain means operatively connects the second sprocket wheel to the second free-wheel cluster. In this manner, the pedaling effort applied to the front pedal system is independently applied to one side of the driven wheel while the pedal effort applied to the second pedal system is independently applied to the other side of the driven wheel.

BRIEF DESCRIPTION OF THE DRAWINGS

Embodiments of the present invention are shown by example and accompanying drawings wherein:

FIG. 5 is a perspective view of a sprocket mechanism for use in connection with the present invention;

FIG. 6 is a plan view of a modified version of the sprocket mechanism shown in FIG. 5;

FIG. 7 is a perspective view of another embodiment of a sprocket mechanism;

FIG. 8 is a another embodiment of the sprocket mechanism shown in FIG. 6;

DETAILED DESCRIPTION

Figure 1:
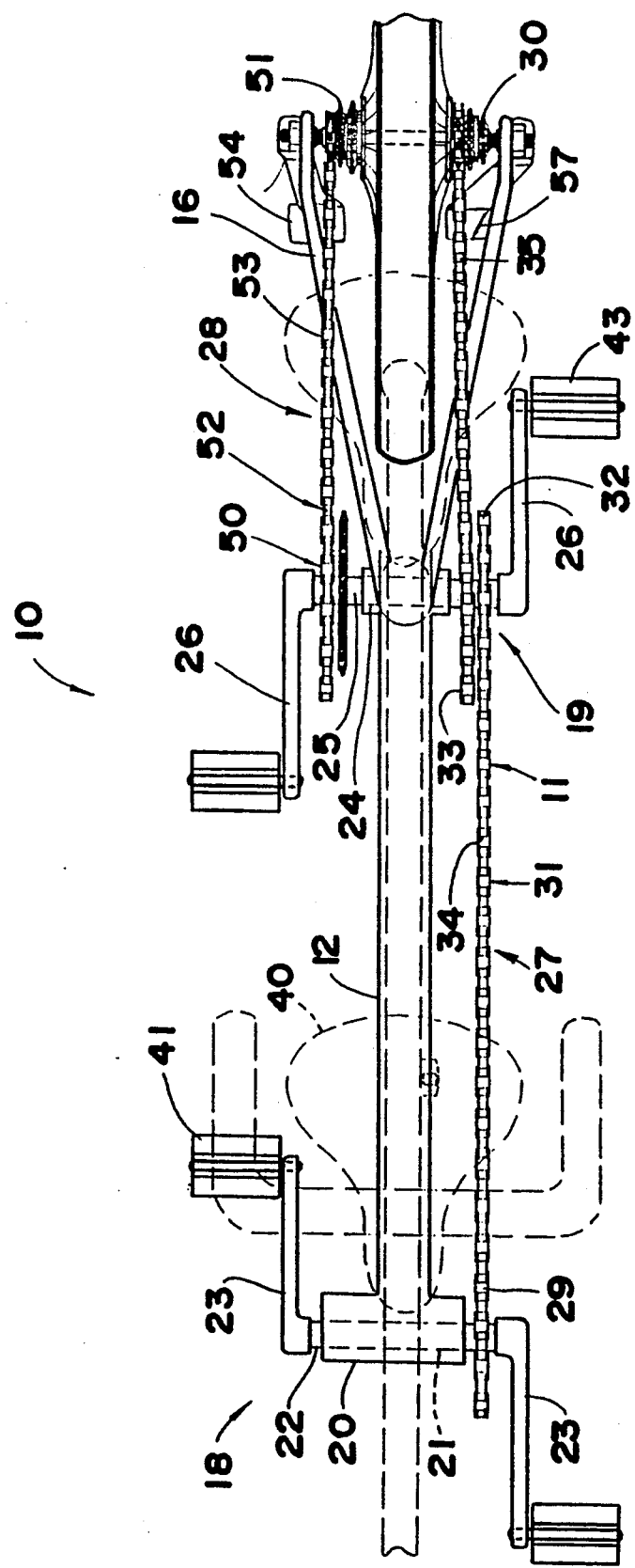
FIG. 1 is a top plan view of a tandem bicycle, with some parts broken away, showing one embodiment of the present invention wherein each rider is provided with a separate gear shift mechanism.
Figure 2:
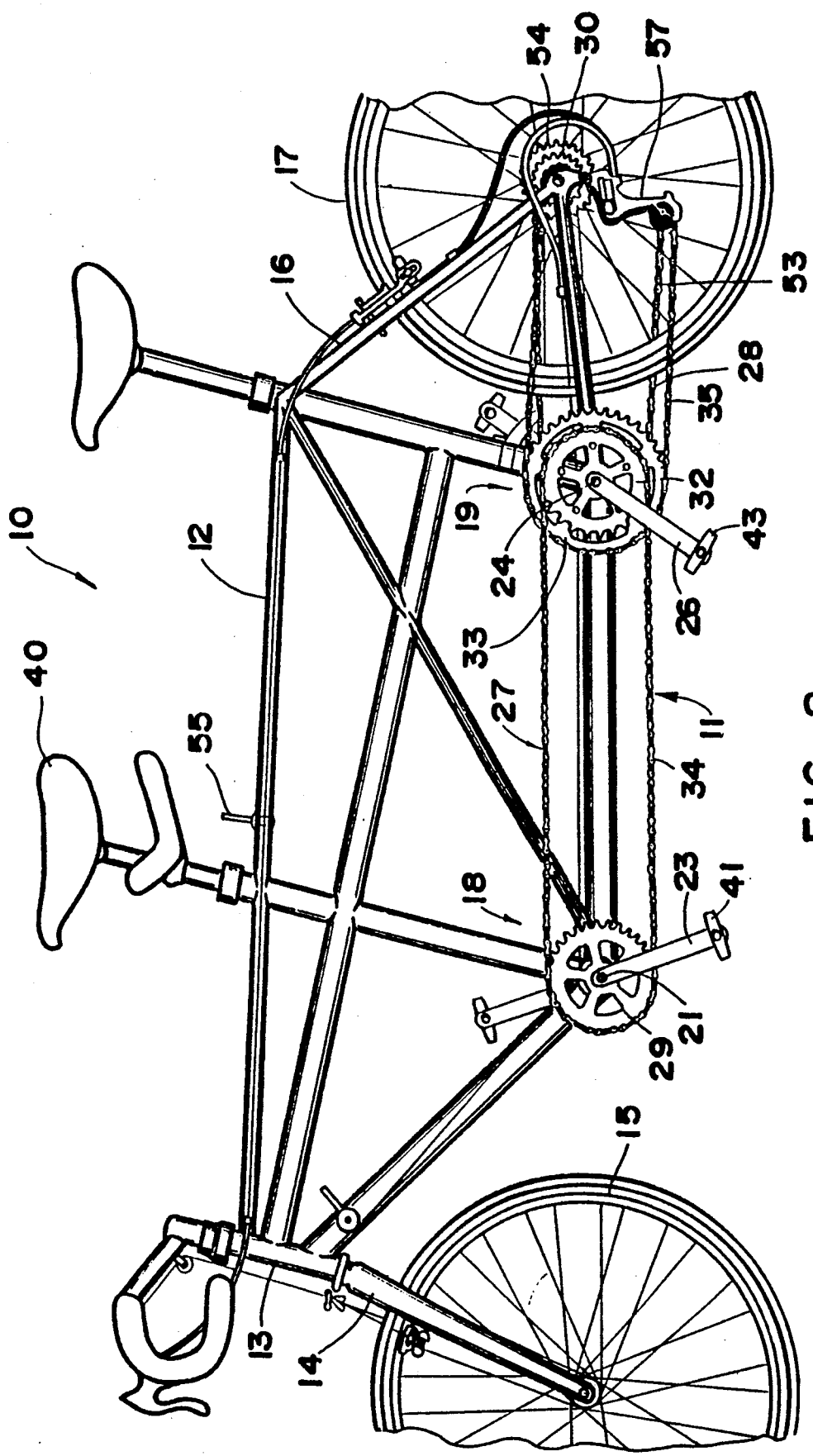
FIG. 2 is a side view of the tandem bicycle shown in FIG. 1.
Figure 3:
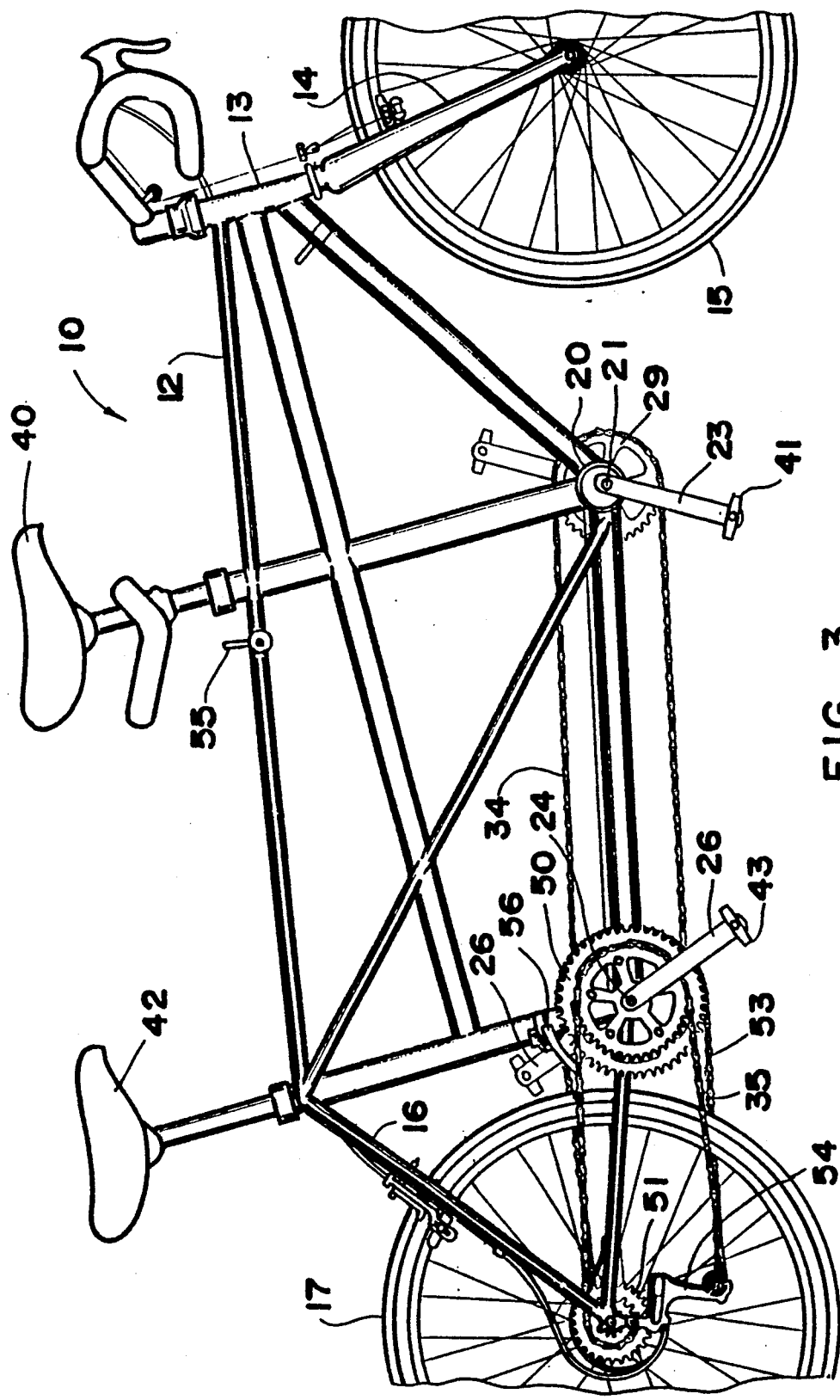
FIG. 3 is a view from the opposite of the tandem bicycle shown in FIG. 2, but showing a shifted position of the bicycle chain from that shown in FIGS. 1 and 2.

Referring now to FIGS. 1-3 of the drawings, reference numeral 10 designates a tandem bicycle into which transmission system 11 of the present invention is incorporated. Bicycle 10 comprises frame 12 at the front of which is steering mechanism 13 (FIG. 2) carrying front fork arms 14 between which is mounted front steerable ground engaging wheel 15 in a known and conventional manner. Frame 12 further includes rear support 16 (FIGS. 1 and 2) carrying rear, driven, ground engaging wheel 17 in a known and conventional manner.

Frame 12 is further provided with front pedal system 18 and rear pedal system 19. Each of the pedal systems includes a shaft rotatably mounted in hub carried on the frame. Specifically, front pedal system 18 includes front hub 20 mounted on the frame for rotatably receiving front shaft 21 having axial ends 22 to which pedal cranks 23 are rigidly connected for rotating shaft 21 in response to pedal rotation of the cranks.

Rear pedal system 19 includes rear hub 24 connected to the frame within which rear shaft 25 is rotatably mounted. Cranks 26 are rigidly connected to the axial ends of shaft 25 such that shaft 25 is rotatable in hub 24 in response to pedal rotation of cranks 26.

According to the present invention, first means 27 are provided for coupling shaft 21 of the front pedal system to rear wheel 17 so that pedal rotation of cranks 23 connected to shaft 21 imparts rotation to wheel 17. Second means 28 are provided for coupling shaft 25 of the rear pedal system to rear wheel 17 so that pedal rotation of cranks 26 connected to shaft 25 imparts rotation to wheel 17.

According to the present invention, first means 27 and second means 28 are constructed and arranged so that pedal rotation of the cranks connected to either one of the shaft 21 or 25 imparts rotation to wheel 17 without imparting rotation to the other of the shafts 21 or 25. An embodiment for achieving this result is shown in FIGS. 1 and 2 wherein first means 27 includes first sprocket wheel 29 rigidly connected to shaft 21 of the front pedal system, first free-wheel cluster mechanism 30 operatively associated in a known manner with one side of wheel 17, and sprocket chain means 31 operatively connecting sprocket wheel 29 to free-wheel cluster mechanism 30. Sprocket chain means 31 includes a pair of sprocket wheels 32, 33 rotatably mounted on the frame of the bicycle, sprocket chain 34 operatively connecting sprocket wheel 29 to one of the pair of sprocket wheels, namely sprocket wheel 32, and sprocket chain 35 operatively connecting the other of said pair of sprocket wheels, namely sprocket 33, to free-wheel cluster mechanism 30.

Preferably, sprocket wheels 32 and 33 are mounted directly on shaft 25 of the rear pedal system for rotation independently of shaft 25. However, this pair of sprocket wheels could be mounted on another portion of frame 12.

The captain of tandem bicycle 10 is located at the front of the bicycle may be seated on forward seat 40 such that the captain is able to place his feet on pedals 41 on the free ends of cranks 23 of the front pedal system, and impart rotation to front crank shaft 21. Chain 34 directly couples the rotation of sprocket 29 occasioned by pedaling motion of the captain to sprocket wheel 32 which is rotatably mounted on shaft 25 of the rear pedal system. Because sprockets 32 and 33 are rigidly connected together, the rotation of shaft 21 by the captain imparts a rotation to sprocket 33. Chain 35, connected to free-wheel cluster 30, transmits the rotation of shaft 21 to free-wheel cluster mechanism 30 thereby powering wheel 17 as a consequence of the pedaling operation of the captain. Because sprockets 32 and 33 are rotatably mounted on shaft 25, the pedaling input by the captain is independent of any activity on the part of the stoker who may be seated on rear seat 42 and whose feet engage pedals 43 that are part of the rear pedal mechanism.

Second means 28 is provided for coupling shaft 25 of the rear pedal system to rear wheel 17 independently of the operation of coupling means 27 by which the front pedal system couples front shaft 21 to the rear wheel. To this end, seconds means 28 includes second sprocket wheel 50 rigidly connected to shaft 25 of the rear pedal system, second free-wheel cluster mechanism 51 operatively associated with the side of driven wheel 17 opposite to the side to which first free-wheel cluster mechanism 30 is associated, and second sprocket chain means 52 operatively connecting sprocket wheel 50 to free-wheel cluster mechanism 51. Second sprocket means 52 includes sprocket chain 53 connecting sprocket wheel 50 to free-wheel cluster mechanism 51.

As in a conventional tandem bicycle, a gear-changing mechanism (derailleur) may be associated with second means 28. This is indicated by rear gear-shifting mechanism 54 operated by gear-shift control 55 located on frame 12. The latter may be under the control of the stoker.

As shown in FIG. 3, an optional front gear-shifting mechanism 56 may be associated with the rear pedal mechanism. In such case, a greater degree of mechanical advantage is achieved when front and rear gear-changing mechanisms are utilized.

A gear-changing mechanism may be associated, optionally, with first means 27. As shown in FIGS. 1-3, rear gear-shifting mechanism 57 is associated with first free-wheel cluster 30 to provide the captain with the ability to adjust the mechanical advantage afforded by the gear-changing mechanism to his own needs independently of the stoker. Additionally, a front gear-shifting mechanism can be associated with first means 27.

In operation, the captain is capable of supplying direct torque to rear wheel 17 by mechanical pedaling motion applied to the front pedal system. The stoker, on the other hand, is capable of independently supplying torque to rear wheel 17. Each individual has independently operable gear-shifting mechanisms at his disposal. Thus, each of the captain and stoker is capable of independent pedal input to the rear wheel of the bicycle.

Figure 4:
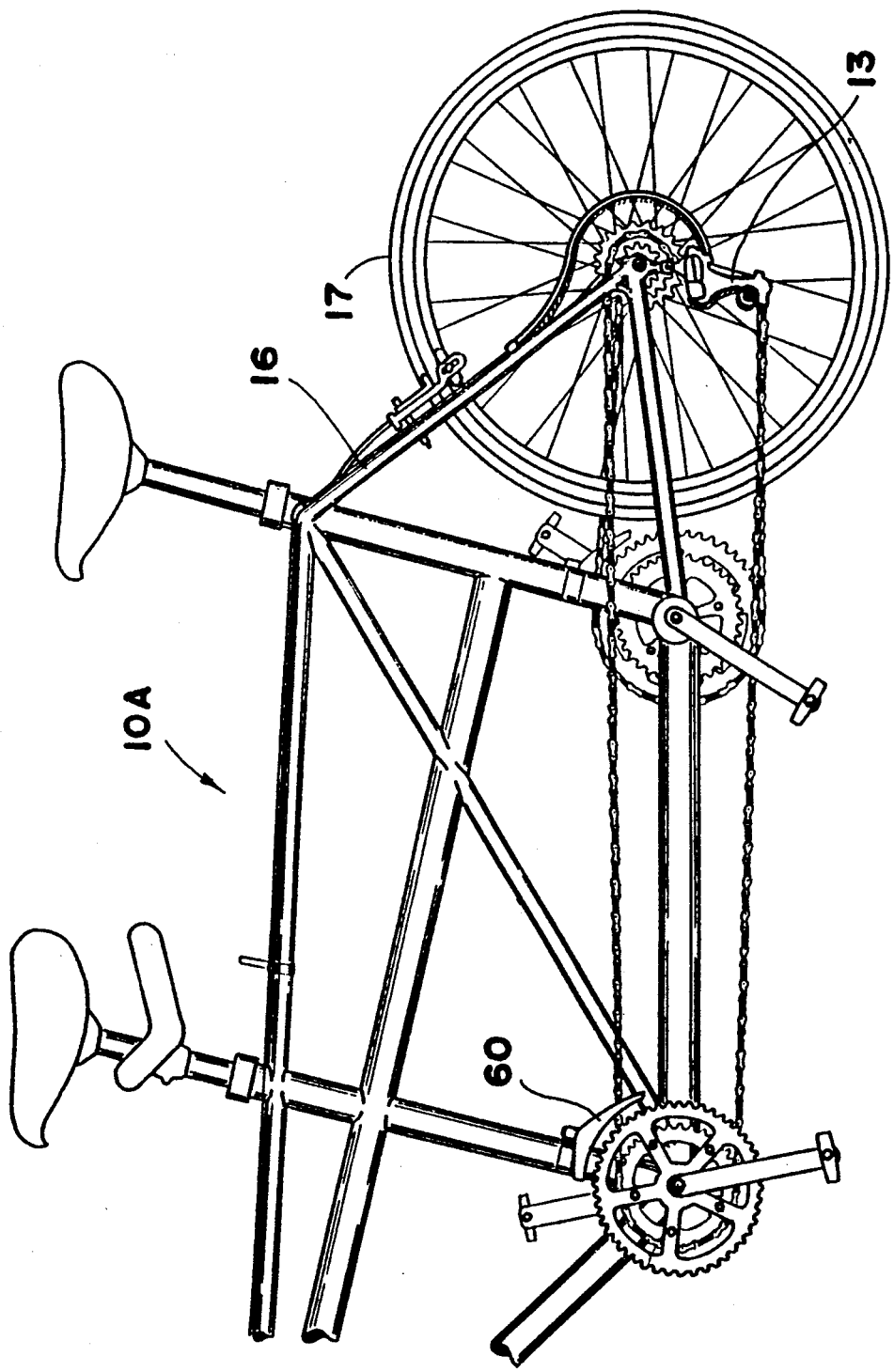
FIG. 4 is a modification of the embodiment shown in FIG. 1 wherein a front gear shift mechanism is incorporated into the tandem bicycle.

In the modification shown in FIG. 4, bicycle 10A includes front gear-shifting mechanism 60 incorporated into the front pedal system thereby establishing a finer range for the mechanical advantage between the front pedal system and the rear wheel. As in the previous embodiment, the pedaling input by each of the riders on the bicycle is independent of the other.

FIG. 5 is a perspective view of sprocket gear means 60 suitable for use as part of a front gear-shift mechanism by the stoker in the embodiment shown in FIGS. 1-3, or by both the stoker and the captain in the embodiment of FIG. 4. Sprocket gear means 60 includes a pair of sprockets 61 and 62 rigidly connected together for rotation about a common shaft. The arrangements shown in FIG. 5 is suitable for both the front and rear pedal systems in association with the rotatable shaft, and a front gear-changing mechanism. More than two sprockets can be connected as shown in FIG. 6 if this is desired. With the arrangement shown in either of FIGS. 5 or 6, a front gear-shifting mechanism is available to each of the riders.

In the embodiment shown in FIG. 7, ratchet mechanism 70 is associated with sprocket gear means 60A which comprises sprocket gears 61 and 62. A shaft (not shown), such as shaft 21 or shaft 24, is rigidly coupled to one part of mechanism 70, the other part of the mechanism being coupled to member 60A. A ratchet interconnection (not shown) interconnects the two parts of mechanism 70 such that the parts are coupled together when rotation in one direction is effected, and are free to rotate relative to each other when rotation in the opposite direction is effected.

When gear means 60 is associated with front shaft 21, for example, the captain is able to impart rotation in the driving direction to the pair of sprocket wheels by reason of the ratchet interconnection between the parts of ratchet mechanism 70, but will permit free rotation of the shaft in opposite direction. FIG. 8 shows ratchet mechanism 70 applied to a multiple sprocket arrangement.

Figure 9:
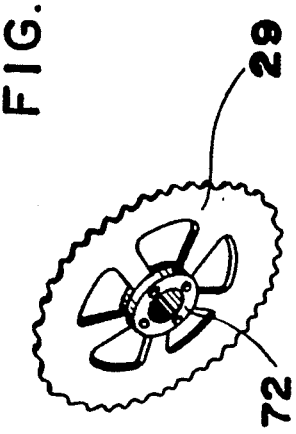
FIG. 9 is a perspective view of a further sprocket mechanism.
Figure 10:
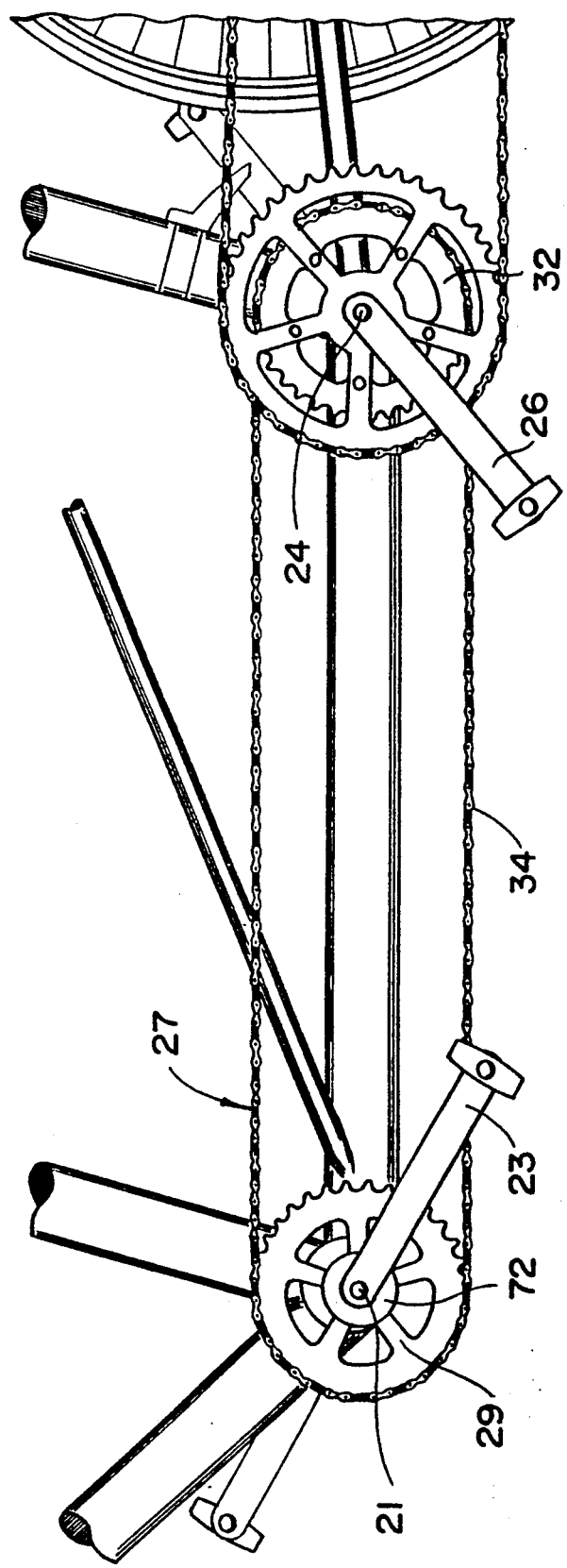
FIG. 10 is a view similar to FIG. 2 but showing sprocket mechanism like that shown in FIG. 7 and 8.

In the embodiment shown in FIG. 9, ratchet mechanism 72 is rigidly attached to single sprocket 29 to provide the desired one-way rotational movement to sprocket wheel 29. FIG. 10 shows the mounting of the ratchet mechanism in an arrangement similar to that shown in FIG. 1.

Figure 11:
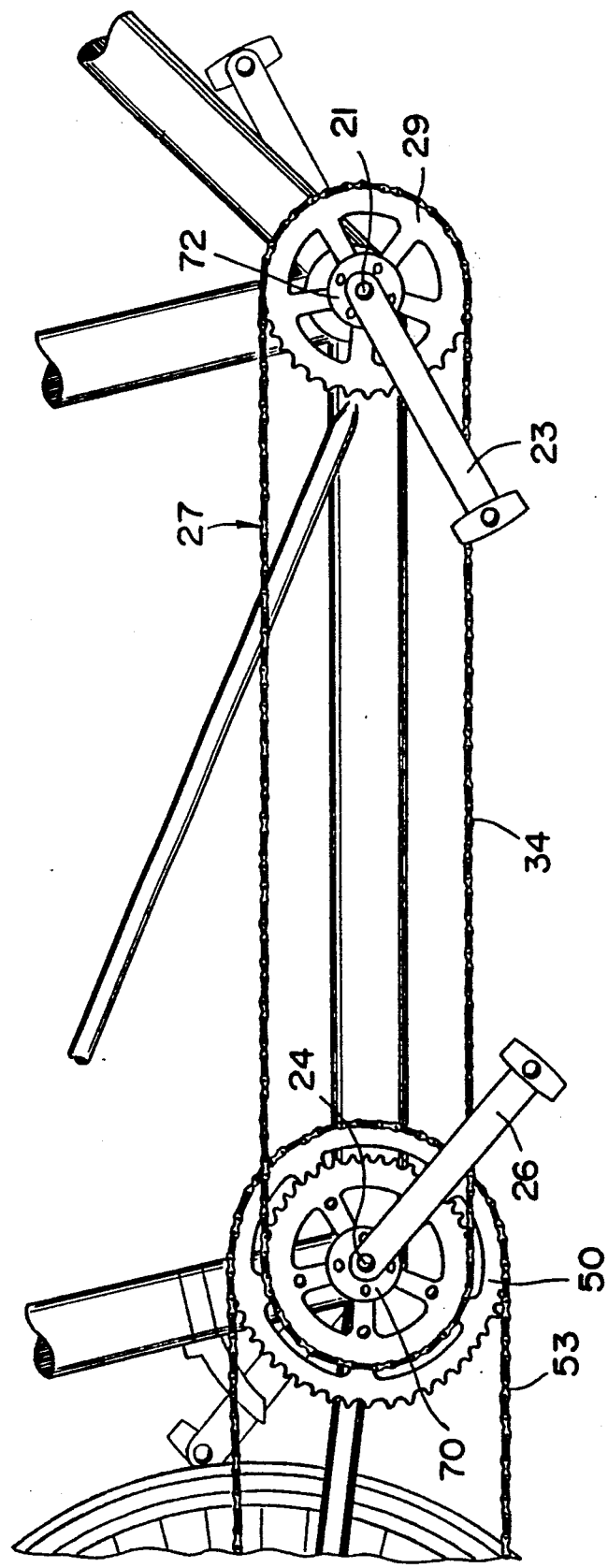
FIG. 11 is a view similar to FIG. 3 of a further modification.

The sprocket attached to the front pedal mechanism can be mounted on either side of the bicycle. FIG. 11 shows a modification of the bicycle shown in FIG. 1 wherein the front sprocket is mounted on the right side rather than the left side. Furthermore, a ratchet mechanism may be associated with either or both of the front and rear pedal systems as indicated above.

The above-description deals with a two-rider tandem bicycle that effects pedaling independence between the riders thereby permitting the riders to pedal in or out of phase, and any degree therebetween. In addition, the mechanical advantage between the rider-driver sprockets and the driven wheel is independently and individually controlled. These principles are also applicable to a three rider tandem bicycle with a wheel base no greater than that of a standard tandem thereby retaining all of the advantages of the latter.

Figure 12:
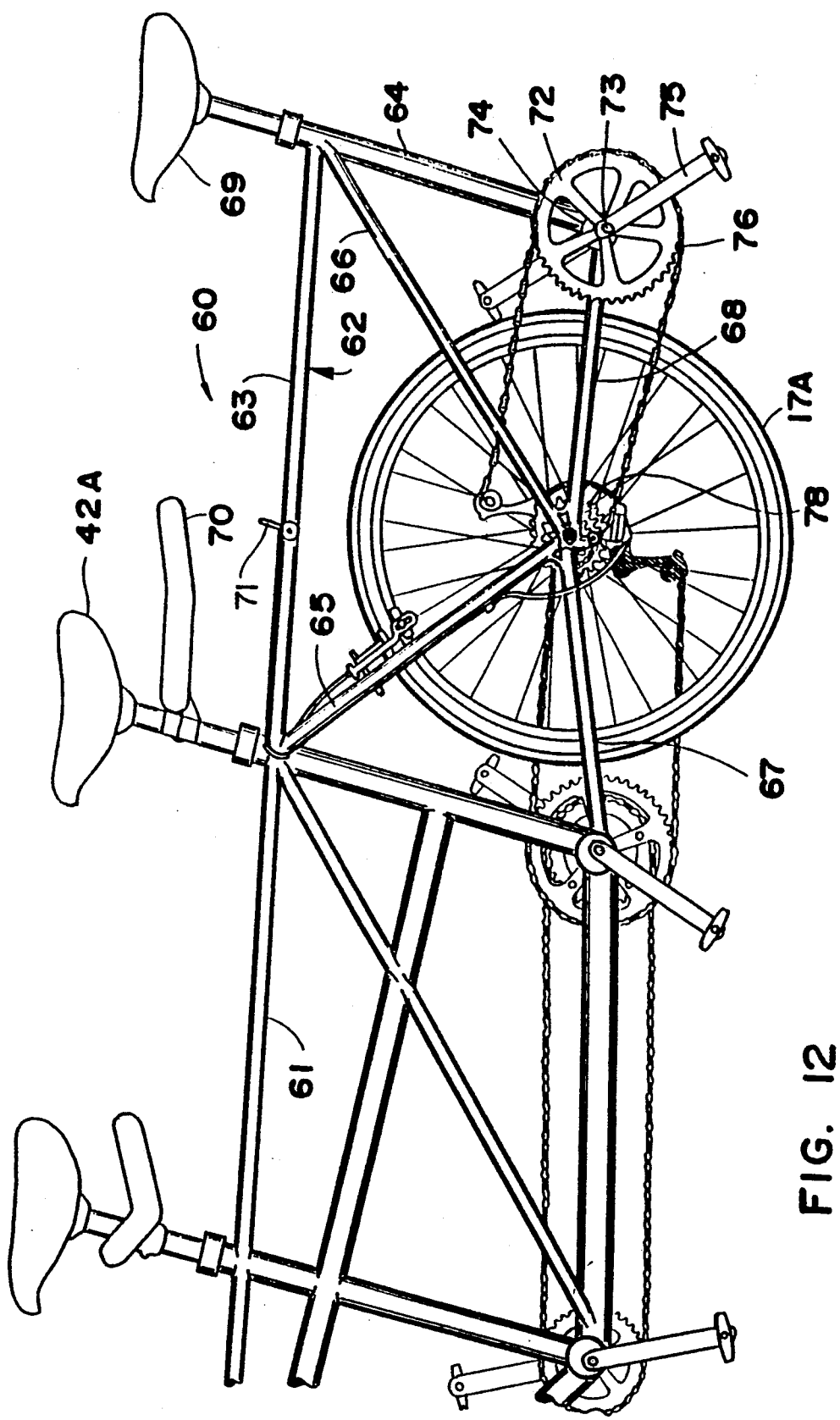
FIG. 12 is a further modification of a tandem bicycle for providing a third rider.

Referring now to FIG. 12. bicycle 60 is provided with sub-frame 61 similar to frame 12 of the embodiment described above, and additional sub-frame 62 to support a third rider. Sub-frame 62 includes the usual horizontal tube 63, saddle tube 64 parallel to the two other saddle tubes of sub-frame 61, and four pairs of substantially tubular elements 65, 66, and 67, 68. The latter converge to, and are secured on, rear wheel axis of rear wheel 17A. In this manner, the rear brackets form, on each side, two pairs of converging rear triangles that are reinforced by substantially horizontal tube 63.

Bicycle 60 includes rear saddle 69 positioned rearwardly of saddle 42A of the second rider; and rearmost handlebars 70 that may be gripped by the third rider. Within easy reach of the third rider is shift actuator 71 by which the third rider is able to control the mechanical advantage between drive sprocket 72 and driven wheel 17A.

Sprocket 72 is rigidly attached to drive shaft 73 journalled in hub 74 located at the junction between bars 64 and 68. Rigidly attached at the opposite ends of shaft 73 are pedal cranks 75 by which the third rider imparts rotation to shaft 73.

Sprocket chain 76, operatively engaged with sprocket 72, is also engaged with gear shifting mechanism 77 associated with free wheel cluster 78 connected to one side of rear driving wheel 17A. On the other side of the wheel is another free-wheel cluster 79 that is part of the transmission operated by the first and second riders. Their pedal input to the rear wheel is separate from that of the third rider.

Sprocket chain 80 connects free-wheel cluster 78 to sprocket 81 carried by the second pedal system which is ratcheted, as described above, to shaft 25A journalled in second hub 24A. In this way, the pedaling efforts by the first and second riders are isolated from each other; and the pedaling effort by the rider is isolated from that of each of the other two riders.

Figure 13:
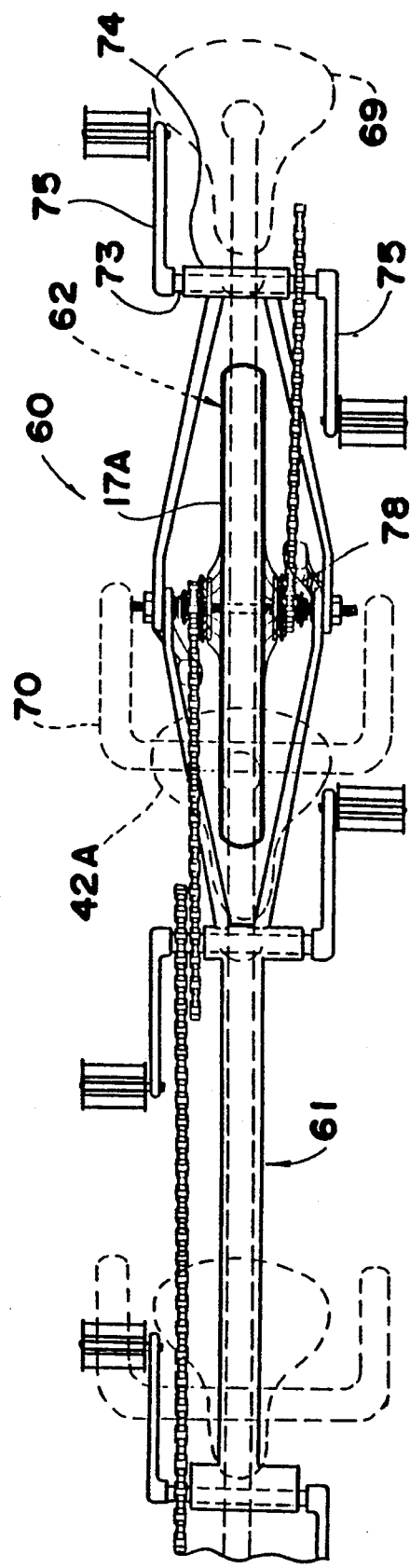
FIG. 13 is a top view of a bicycle shown in FIG. 12.

Of significance is the fact that the wheel base of the embodiment of FIGS. 12 and 13, which is designed for three riders, is the same as that of the other embodiments which are designed for two riders. As a consequence, the incremental weight of the structure associated with the third rider is lower than the incremental weight associated with adding a second rider to a single rider bicycle. In addition, the three rider tandem of this embodiment of the invention has very good handling characteristics. Of course the pedal input of each rider in this embodiment is independent. The front and middle riders must pedal at the same gear shift setting which would be under the control of the captain. The rear rider, however, may set his own gear as indicated.

The advantages and improved results furnished by the method and apparatus of the present invention are apparent from the foregoing description of the preferred embodiment of the invention. Various changes and modifications may be made without departing from the spirit and scope of the invention as described in the appended claims.

I claim:

1. A transmission system for tandem bicycle having a frame on which are mounted a front steerable ground engaging wheel, and a rear, driven, ground engaging wheel, and having front and rear pedal systems each of which includes a shaft rotatably mounted in a hub carried by the frame, each shaft having axial ends to which pedal cranks are connected for rotating the shaft in response to pedal rotation of said cranks, said system comprising:

a) first means for coupling the shaft of said front pedal system to said rear wheel so that pedal rotation of the cranks connected to the last mentioned shaft imparts rotation to said driven wheel;

b) second means for coupling the shaft of said rear pedal system to said rear wheel so that pedal rotation of the cranks connected to the last mentioned shaft imparts rotation to said driven wheel;

c) said first and second means being constructed and arranged so that pedal rotation of the cranks connected to one of the shafts imparts rotation to said driven wheel without imparting rotation to the other of the shafts;

d) said first means including a first sprocket wheel rigidly connected to the shaft of said front pedal system, a first free-wheel cluster mechanism operatively associated with one side of said driven wheel, and sprocket chain means operatively connecting said first sprocket wheel to said first freewheel cluster mechanism; and e) said second means including a second sprocket wheel rigidly connected to said shaft of said rear pedal system, a second free-wheel cluster mechanism operatively associated with the other side of said driven wheel, and second sprocket chain means operatively connecting said second sprocket wheel to said second free-wheel cluster.

2. A transmission system according to claim 1 wherein said sprocket chain means includes a pair of sprocket wheels rotatably mounted on the frame of the bicycle, a sprocket chain operatively connecting said first sprocket wheel to one of said pair of sprocket wheels, and a sprocket chain operatively connecting the other of said sprocket wheels to said first free-wheel cluster mechanism.

3. A transmission system according to claim 2 wherein said pair of sprockets wheels are mounted on the shaft of the rear pedal system.

4. A transmission system according to claim 1 including a gear shift mechanism associated with each free-wheel cluster for operating the same in response to manual input, and means for supplying manual input to the gear shift mechanism from a single location.

5. A transmission system according to claim 1 including a gear shift mechanism associated with each free-wheel cluster for operating the same in response to manual input, and means for supplying manual input to the gear shift mechanism from a plurality of locations.

6. A transmission system according to claim 5 wherein said second means includes a second sprocket wheel mounted for rotation on the frame of the bicycle, a ratchet mechanism interconnecting said second sprocket wheel and the shaft in which the latter is mounted, a second free wheel cluster mechanism operatively associated with said driven wheel, and second sprocket chain means operatively connecting said second sprocket wheel to said second free wheel mechanism.

7. A transmission system according to claim 6 wherein said second sprocket wheel is mounted for rotation about the axis of the shaft of the rear pedal system.

8. A transmission system according to claim 1 wherein said first means includes a first sprocket wheel mounted for rotation about the axis of the shaft of said front pedal system, a ratchet mechanism interconnecting said first sprocket wheel to the shaft on which the first sprocket wheel is mounted, a first free-wheel cluster mechanism operatively associated with said driven wheel, and sprocket chain means operatively connecting said first sprocket wheel to said first free-wheel cluster mechanism.

9. A transmission system according to claim 1 wherein said second means includes a second sprocket wheel mounted for rotation about the axis of the shaft of said rear pedal system, a ratchet mechanism interconnecting said second sprocket wheel and the shaft on which the latter is mounted, a second free-wheel cluster mechanism operatively associated with said driven wheel, and second sprocket chain means operatively connecting said second sprocket wheel to said second free-wheel mechanism.

10. A transmission system according to claim 9 wherein said sprocket chain means includes a pair of sprocket wheels rotatably mounted on the shaft of said rear pedal system, a sprocket chain operatively connecting said first sprocket wheel to one of said pair of sprocket wheels, and a sprocket chain operatively connecting the other of said sprocket wheels to said first free-wheel cluster mechanism.

11. A transmission system according to claim 10 wherein said second means includes a second sprocket wheel rigidly connected to the shaft of said rear pedal system, a second free-wheel cluster mechanism operatively associated with the other side of said driven wheel, and second sprocket chain means operatively connecting said second sprocket wheel to said freewheel cluster.

12. A transmission system according to claim 11 including a gear shift mechanism associated with each free-wheel cluster for operating the same in response to manual input, and means for simultaneously controlling the gear shift mechanism from a single location.

13. A transmission system according to claim 11 including a gear shift mechanism associated with each free-wheel cluster for operating the same in response to manual input an means for individually controlling the gear shift mechanisms.

14. A tandem bicycle having a transmission system according to claim 1.

15. A transmission system for a bicycle having a frame on which are mounted a front steerable ground engaging wheel, and a rear, driven, ground engaging wheel, and having three pedal systems each of which includes a shaft rotatably mounted in a hub carried by the frame, each shaft having axial ends to which pedal cranks are connected for rotating the shaft in response to pedal rotation of said cranks, said system comprising:

a) first means for coupling the shaft of a first one of said pedal systems to said rear wheel so that pedal rotation of the cranks connected to the last mentioned shaft imparts rotation to said driven wheel; and b) second means for coupling the shaft of a second one of said pedal systems to said rear wheel so that pedal rotation of the cranks connected to the last mentioned shaft imparts rotation to said driven wheel;

c) third means for coupling the shaft of a third one of said pedal systems to said rear wheel so that pedal rotation of the cranks connected to the last mentioned shaft imparts rotation to said driven wheel;

d) said first, second, and third means including means enabling to pedal rotation of the cranks connected to one of the shafts to impart rotation to said driven wheel, without imparting rotation to the other of the shafts independently of the relationship between the power torque applied to each of the shafts.

16. A transmission system according to claim 15 wherein said first, second, and third means includes a separate free-wheel cluster mechanism located on opposite sides of the driven wheel.

17. A transmission system for tandem bicycle having a frame on which are mounted a front steerable ground engaging wheel, and a rear, driven, ground engaging wheel, and having front and rear pedal system each of which includes a shaft rotatably mounted in a hub carried by the frame, each shaft having axial ends to which pedal cranks are connected for rotating the shaft in response to pedal rotation of said cranks, said system comprising:

a) first means for coupling the shaft of said front pedal system to said rear wheel so that pedal rotation of the cranks connected to the last mentioned shaft imparts rotation to said driven wheel;

b) second means for coupling the shaft of said rear pedal system to said rear wheel so that pedal rotation of the cranks connected to the last mentioned shaft imparts rotation to said driven wheel independently of pedal rotation of the cranks of the first means;

c) said first and second means including means enabling simultaneous rotation of the shafts of the front and rear pedal systems in response to individual pedal rotation of the cranks connected to the shafts to impart rotation to said driven wheel independently of the relationship between the torque applied to each of the shafts.

18. A transmission system according to claim 17 wherein each of said first and second transmission means includes a separate free-wheel cluster mechanism located on respective sides of the driven wheel.

* * * * *